Dec. 16, 1947. C. CRISWELL 2,432,659
BALANCING MEANS FOR ROTATABLE ELEMENTS
Filed Aug. 2, 1943 2 Sheets-Sheet 1

Inventor
Carmer Criswell

Dec. 16, 1947.   C. CRISWELL   2,432,659
BALANCING MEANS FOR ROTATABLE ELEMENTS
Filed Aug. 2, 1943   2 Sheets-Sheet 2

Inventor
Carmer Criswell
By Blackmore, Spencer & Hines
Attorneys

Patented Dec. 16, 1947

2,432,659

UNITED STATES PATENT OFFICE 2,432,659

BALANCING MEANS FOR ROTATABLE ELEMENTS

Carmer Criswell, Detroit, Mich., assignor to General Motors Corporation, Detroit, Mich., a corporation of Delaware Application August 2, 1943, Serial No. 497,100

7 Claims. (Cl. 91—13)

This invention relates to a balancing means and more specifically to a means for dynamically balancing rotatable parts while they are in motion. There are at present many installations in which it is necessary carefully and accurately to balance moving and rotating parts dynamically so that they may run at high speeds with a minimum of vibration. As illustrative of some applications which required careful balance, and in nowise limiting the application of my invention, may be mentioned such devices as gyroscope rotors, or supercharger impellers. These mechanisms must run at high speeds, and from a standpoint of minimum vibration, power input and long wear, should be dynamically balanced under normal working conditions to as near perfect balance as possible.

In the past, to reach the tolerances required, it has been common practice to rotate the part at its designed speed, and through vibration pickup means and the synchronizing means the amount and annular location of the unbalance has been located. The part is then stopped and possibly removed from the balancing machine, and small amounts of metal and/or other substance of which the body may be composed are either added or removed from the critical points in an attempt to reach balance. The body is then replaced in the balancing machine and again brought up to speed and checked. This process is repeated until satisfactory or perfect balance is attained. This obviously will require a number of trials, each approaching more nearly the balanced condition as by this method it is only by trial that the operator would know whether enough material had been removed or added. Considerable time is required in most instances to bring a rotor such as suggested above up to its rated speed and also to reduce the speed to zero after each trial which is, in the main, wasting time as far as getting the body balanced is concerned.

It is therefore an object of my invention to provide means for balancing a rotatable part during normal rotation.

It is a further object of my invention to provide means to balance a rotating part during rotation and to permit visual observation of the approach of the body toward balanced condition.

It is a still further object of my invention automatically to apply to a predetermined critical point in a rotating body periodic small deposits of material for balancing.

With these and other objects in view, the embodiments of my invention will best be shown by referring to the following specification and claims and the illustrations in the accompanying drawing, in which:

Figure 4 is a sectional view taken on the line 4—4 of Figure 1.

Figure 1:
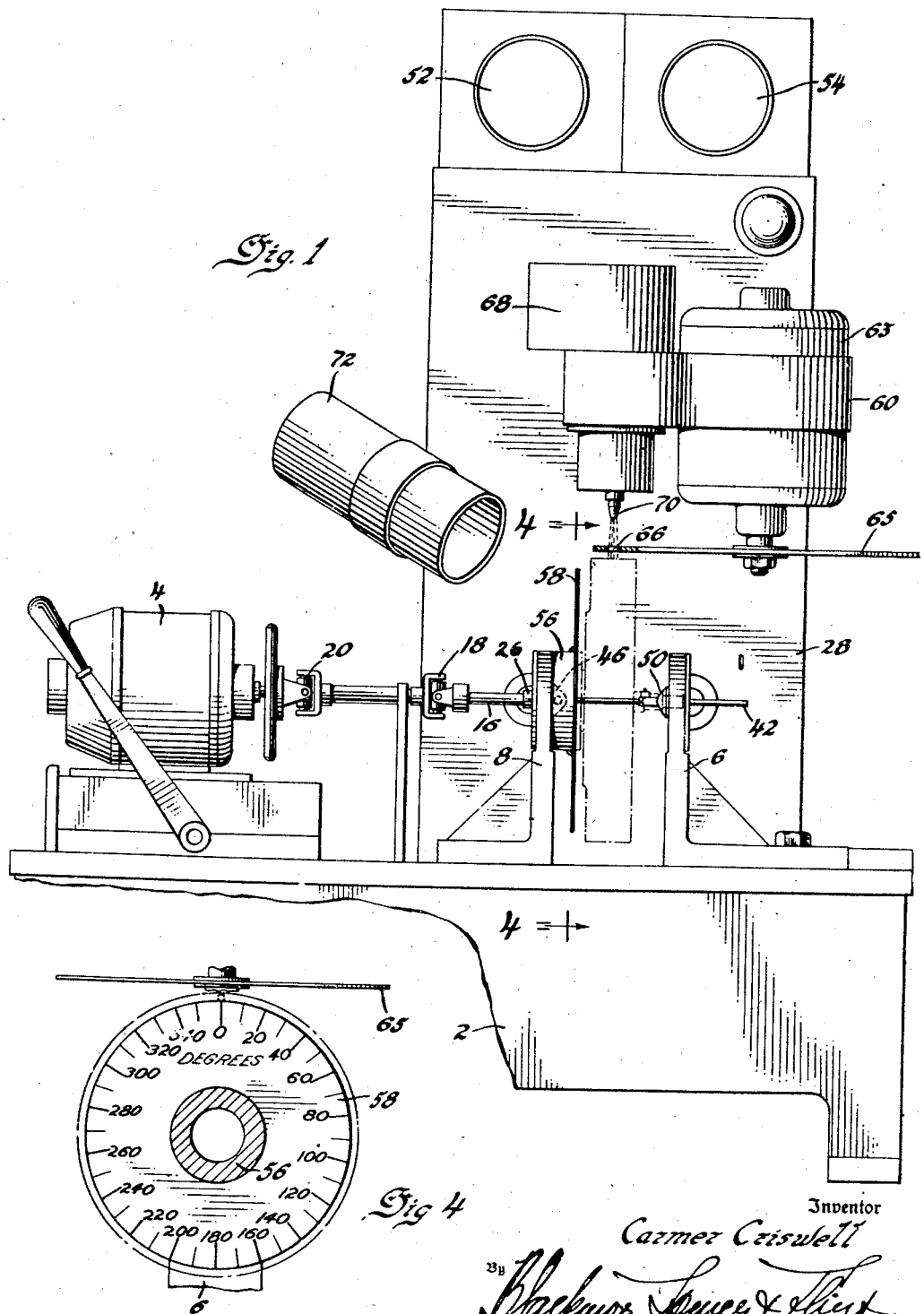
Figure 1 is a side elevation of a mechanism embodying my invention.

Referring now more specifically to the drawings, there is shown in Figure 1 a suitable base 2 upon which is mounted driving means 4 in the form of a motor for rotating the part to be balanced such for example as a metal rotor. Slidably mounted on the base 2 is a vertical supporting bracket 6 for supporting one end of the shaft of the rotor which bracket may be slid back and forth to allow the rotor to be placed in position. Rigidly mounted in spaced position to the first bracket is a second bracket 8, supporting the opposite end of the rotor. Each of these brackets supports a roller bearing assembly 10 which is resiliently mounted in a large opening 12 in the bracket by means of the resilient support 14. The roller bearing assembly 10 in the bracket 8 has its inner or rotating part which supports the end of the shaft of the rotor being tested in juxtaposition to the drive shaft 16 which is connected back through two universal joint assemblies 18 and 20 to the driving motor 4. The end of the shaft 16 is enlarged and cored out as at 22 to provide a sleeve into which the end of the test rotor fits. A set screw 24 is provided in this sleeve to clamp the rotor shaft in driving connection.

In operation, the right hand standard or bracket is moved sufficiently to the right as shown in Figure 1 to allow the rotor to be inserted, the left hand shaft being placed in the sleeve of the drive shaft 16 through the roller bearing assembly 10. The bracket 6 is then moved back into position to support the right hand end of the rotor shaft and the clamping nut 26 is then tightened to hold the bracket in correct position. Upon energization of the motor 4, the rotor will be now brought up to speed.

Figure 2:
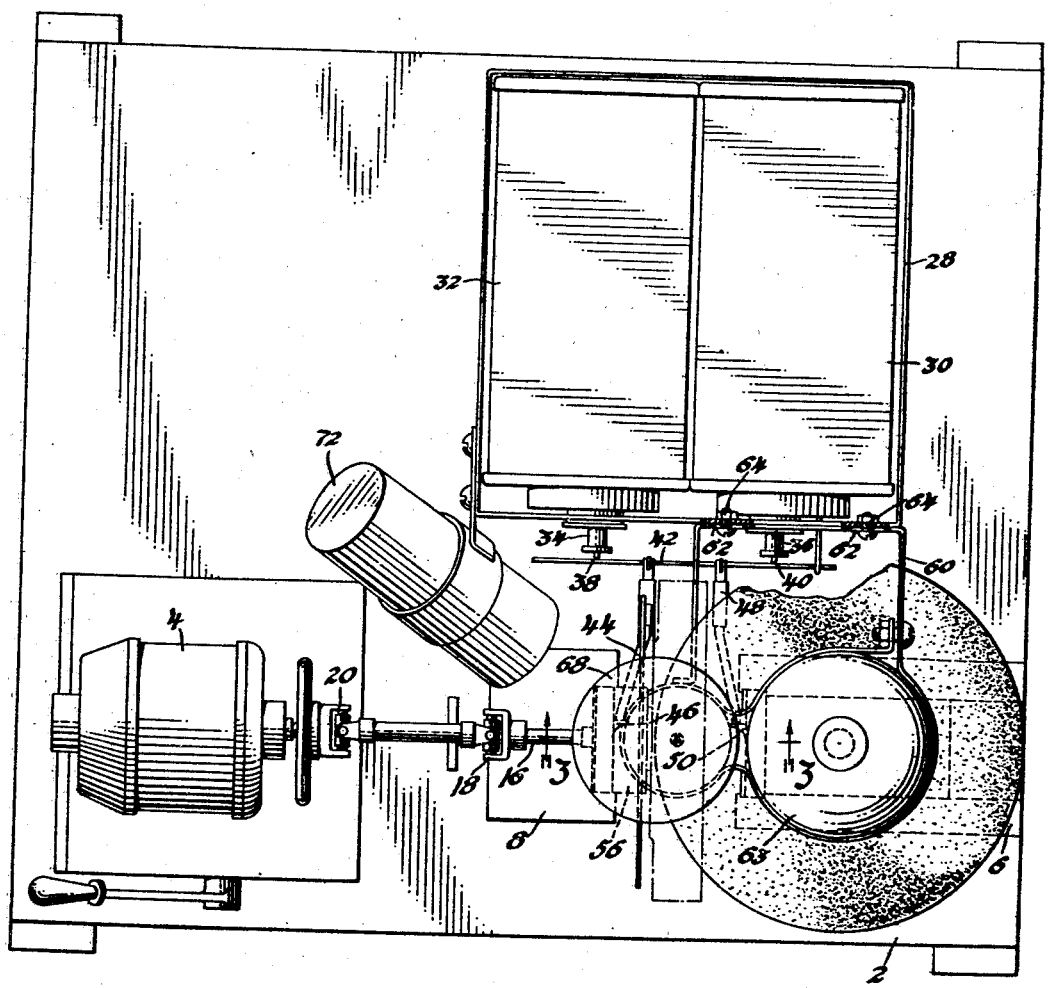
Figure 2 is a top elevation of the same mechanism.
Figure 3:
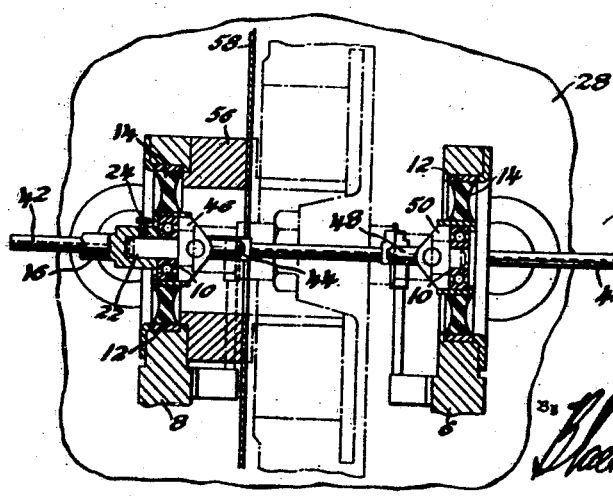
Figure 3 is an enlarged sectional view taken on the line 3—3 of Figure 2.

Supported in back of the rotor, as shown in Figure 2, is a standard 28 which supports two oscillograph units 30 and 32 to which are connected two pickup units 34 and 36 which are supported in the lower portion of this housing. These pickup units have movable portions 38 and 40 which contact a horizontal bar 42 known as a nodal bar which is adapted to be vibrated back and forth by rotor vibration and which in so doing transmits such vibration to the movable elements 38 and 40 of the pickup units to alter electrical characteristics therein, such as, for example, the inductance or capacity, the pickup units being connected in turn with the oscillograph elements to vary the wave pattern on the screens.

To one side of the bar 42 is connected a transverse connecting rod assembly 44 which extends up to and is connected to a bracket 46 rigidly connected to the bearing assembly 10 on the left hand bracket 8. In similar manner on the opposite side of the rotor, and connected to the bar 42, is a transfer rod assembly 48 which connects to a similar bracket 50 of the bearing assembly 10 in bracket 6. Thus, if the rotor shaft in the process of rotating the rotor at its normal or rated speed vibrates and transmits such vibration to the bearing assemblies 10, the two rod assemblies 44 and 48 will transmit such vibration back to the nodal bar 42 and thus the pickup unit 34 will have its electrical characteristics varied, depending upon the vibration of the left hand end of the rotor shaft, and the pickup unit 36 will have its characteristics varied, depending upon the vibration of the right hand end of the rotor shaft. There will, of course, be some intermixing of the vibrations due to the fact that the bar 42 is continuous, but for all practical purposes the above is correct.

As the pattern on the screens 52 and 54 of the oscilloscopes 32 and 30 vary, the operator can observe by the vertical amplitude of the wave the amount of unbalance in either or both ends of the shaft and therefore the unbalance of the rotor. This unbalance will occur, of course, at some predetermined angular position on the rotor. It is therefore necessary to ascertain the angular position of such unbalance, and this is done by marking a certain index spot on one side face of the rotor and causing a beam of light to impinge upon the rotor at this radius, and to have so mounted as to receive reflected light a photosensitive cell. Thus, in the rotation of the rotor the reflected beam will fall upon the cell once per revolution and the energization of this cell may be connected to the oscillograph sweep circuit to trigger the same and therefore the operator will know that the beginning of each horizontal sweep occurs at this index point on the rotor. This method of so indexing the rotation and causing the oscillograph to be triggered is well known, and therefore this portion of the apparatus has not been illustrated.

By reading the location of the maximum deflection on one of the oscillographs, the number of degrees which this deflection is removed from the index point can be ascertained. The rotor is then stopped with the index point at the uppermost position. Mounted upon the bracket 8 is a short cylindrical member 56 which carries a dial disc 58 having its periphery marked in degrees with zero at the uppermost position. Thus, if the maximum unbalance on the rotor is observed at 60° on the oscillograph, the operator can then place on the rotor a mark at the 60° point which will be that at which material must be added or removed. If the oscillograph, therefore, shows that at this point the force is greater, the material must be removed from that spot or added to a position diametrically opposite the same. In this instance, since I am adding material instead of removing the same, it will be desirable to mark the diametrically opposite point, namely 240° as that spot to which a small portion of the substance is to be added.

Mounted on the front of the standard 28 is a supporting bracket 60 having slots 62 therein through which the supporting bolts 64 project so that the bracket may be horizontally adjusted back and forth for a short distance across the front face of the standard 28. Supported by this bracket 60 is a small variable speed motor 63 whose shaft is vertical and which carries thereon a relatively large rotatable disc 65 having near its periphery at one point an opening 66. This portion of the disc is so mounted as to overlie the periphery of the rotor being tested and to act throughout the main portion of its surface as a shield, but to allow material to project through this opening onto the outer periphery of the rotor.

Mounted in axial alignment with this hole or opening 66 toward the rotor periphery is a metal spray gun 68 also supported by the bracket 60. It will thus be obvious that as the spray gun is operating to project metal from the nozzle 70 thereof which is directed toward the periphery of the rotor to be tested, that the same will encounter the upper surface of the disc 65 except that location where the opening 66 is provided where it will flow through the same, and thus once per revolution of the disc 65 a small amount of metal may be allowed to impinge onto the surface of the rotor and slowly build up material to balance the same.

However, this added material must be applied at the proper angular point such as mentioned above and the two, that is, the rotor being tested and the disc 65, must be synchronized so that the opening 66 and the spot to which the added weight is to be applied must coincide for each revolution. In order to so adjust and time the two rotating means so that this will occur, a stroboscope 72 is provided which is likewise supported upon the edge of the standard 28 and directs its beam to the locale of the edge of these two rotating members. Thus, by turning on the stroboscope and rotating the rotor at its normal rate of speed with a mark thereon indicating the location of the spot to which the material is to be added, the speed of the variable speed motor 63 is varied until these two points coincide. The gun 68 is then set in operation to discharge small particles of metal and/or other material which will then be projected onto and adhere to the rotor at the proper location in very small quantities. As this occurs, the operator can then view the resultant curve on the oscillograph and continue this operation until the curve has become flat, indicating no or very little vibration.

Of course, if the curve for any reason increases, showing increased vibration, then the operator knows immediately that something has gone wrong with his calculations and must readjust. The reason for using two oscillographs is that the vibration of the two ends may be different if the rotor has any appreciable width, and by having two, both ends can be checked simultaneously, and if the unbalance occurs at different angular positions or in different quantities for the two ends, the slotted connection of the bracket 60, assembly of the variable speed motor and metal gun permits it to be moved across the surface of the rotor periphery to deposit the metal at any point within the width of the rotor where necessary.

I claim:

1. In balancing means, means for rotating a part to be balanced, means for depositing a small quantity of material at one position on the periphery of the part as it rotates, and means for enabling the operator to synchronize the depositing means with the rotating means so that the progressive deposits will overlie each other at one location.

2. In balancing means, means for rotating a part to be balanced, means for projecting material adapted to adhere to the rotating part toward its periphery, intercepting means movable between the projecting means and the periphery of the rotating part having an opening therein and means for enabling the operator to synchronize the speed of the moving intercepting means with the speed of the rotating part so that material will pass through the opening in the intercepting means onto the periphery of the rotating part at one point in overlying layers.

3. In balancing means, means for rotating a part to be balanced, means for projecting material adapted to adhere to the rotating part toward its periphery, a rotatable disc extending between the projecting means and the rotating part having an opening therein to allow passage of material through to the rotating part when the opening is in alignment therewith, and means for enabling the operator to synchronize the speeds of the rotating part and the disc.

4. In balancing means, means for rotating a part to be balanced, pickup means actuated by the vibration of the part as it rotates, oscillograph means actuated by the pickup means to indicate the condition of the part, means for projecting material to adhere to the rotating part toward the same and synchronously driven intercepting means to control the flow of the material toward the part and pass it for only a small portion of a revolution of the intercepting means.

5. In balancing means, means for rotating a part to be balanced, pickup means actuated by the vibration of the part as it rotates, oscillograph means actuated by the pickup means to indicate the condition of the part, means for projecting material to adhere to the rotating part toward the same and synchronously driven intercepting means to control the flow of the material toward the part and pass it for only a small portion of a revolution of the intercepting means, and means for adjusting the two synchronously driven means in such manner that the material is deposited continuously at the proper locale.

6. In balancing means, means for rotating a part to be balanced, pickup means actuated by the vibration of the part as it rotates, oscillograph means actuated by the pickup means to indicate the condition of the part, a gun for spraying metal toward the part, a rotatable disc interposed between the gun and the part and having an opening therethrough through which the metal may impinge upon the part at one point of its periphery only, and means for adjustably driving the disc to synchronize it with the part whereby the additional portions of metal are built up at that point and the pattern on the oscillograph indicates successive stages of balance.

7. In balancing means, means for rotating a part to be balanced, pickup means actuated by the vibration of the part as it rotates, oscillograph means actuated by the pickup means to indicate the condition of the part, a gun for spraying metal toward the part, a rotatable disc interposed between the gun and the part and having an opening therethrough through which the metal may impinge upon the part at one point of its periphery only, and means for adjustably driving the disc to synchronize it with the part whereby the additional portions of metal are built up at that point and the pattern on the oscillograph indicates successive stages of balance, and stroboscopic means to adjust the part and disc for proper location of additive material.

CARMER CRISWELL.

REFERENCES CITED

The following references are of record in the file of this patent:

UNITED STATES PATENTS

| Number | Name | Date |
| --- | --- | --- |
| 2,061,107 | Schellenger | Nov. 17, 1936 |
| 2,316,959 | Hinkley et al. | Apr. 20, 1943 |
| 2,329,654 | Rouy | Sept. 14, 1943 |
| 2,131,602 | Thearle | Sept. 27, 1938 |
| 1,319,928 | Kennedy | Oct. 28, 1919 |
| 1,489,699 | David | Apr. 8, 1924 |
| 2,293,371 | Van Degrift | Aug. 18, 1942 |
| 2,160,981 | O'Brien | June 6, 1939 |
| 2,259,395 | Sachtleben | Oct. 14, 1941 |
| 2,313,339 | Hare | Mar. 9, 1943 |
| 2,110,755 | Bleakley | Mar. 8, 1938 |